United States Patent
Roh et al.

(10) Patent No.: US 11,912,895 B2
(45) Date of Patent: Feb. 27, 2024

(54) FIRE RESISTANT PAINT COMPOSITION, PRODUCTION METHOD FOR SAME, AND PAINTING METHOD FOR FIRE RESISTANT PAINT USING SAME

(71) Applicant: Aerogel R&D Pte. Ltd, Chinatown Point (SG)

(72) Inventors: Myung Je Roh, Seoul (KR); Young Chul Joung, Gyeonggi-do (KR); Jong Chul Park, Gyeonggi-do (KR); Min Woo Kim, Daejeon (KR); Choon Soo Hahn, Jeollabuk-do (KR); Dong Ho Jung, Gyeonggi-do (KR); Do Young Park, Gyeonggi-do (KR)

(73) Assignee: AEROGEL R&D PTE. LTD., Singapore (SG)

( * ) Notice: Subject to any disclaimer, the term of this patent is extended or adjusted under 35 U.S.C. 154(b) by 0 days.

(21) Appl. No.: 15/672,118

(22) Filed: Aug. 8, 2017

(65) Prior Publication Data
US 2017/0335119 A1  Nov. 23, 2017

Related U.S. Application Data

(63) Continuation of application No. PCT/KR2015/001285, filed on Feb. 9, 2015.

(51) Int. Cl.
*C09D 5/18* (2006.01)
*C09D 1/00* (2006.01)
(Continued)

(52) U.S. Cl.
CPC ............ *C09D 5/18* (2013.01); *C09D 1/00* (2013.01); *C09D 1/02* (2013.01); *C09D 7/40* (2018.01);
(Continued)

(58) Field of Classification Search
CPC ........ C08K 2003/265; C08K 2003/267; C08K 3/016; C08K 3/36; C09D 1/00;
(Continued)

(56) References Cited

U.S. PATENT DOCUMENTS 5,480,587 A * 1/1996 Musselman .............. C09C 1/40
428/920

FOREIGN PATENT DOCUMENTS

JP         79035038       * 10/1979
KR    10-0590502 B1       6/2006
(Continued)

OTHER PUBLICATIONS

KR101400718B1 translation(Year: 2014).*
(Continued)

*Primary Examiner* — Shuangyi Abu Ali
(74) *Attorney, Agent, or Firm* — Dentons Cohen & Grigsby P.C.

(57) ABSTRACT

The present invention relates to a fire resistant paint composition, to a production method for same and to a painting method for a fire resistant paint using same, and, one example of implementation of the present invention can provide a fire resistant paint composition comprising: between 70 and 95 wt. % of a binder; between 1 and 10 wt. % of an aerogel; between 1 and 5 wt. % of a foaming agent; and the remainder of water, and can provide a production method for same and a painting method for a fire resistant paint using same.

17 Claims, 7 Drawing Sheets

(51) Int. Cl.
*C09D 7/40* (2018.01)
*C09D 1/02* (2006.01)
*C09D 7/45* (2018.01)
*C09D 7/47* (2018.01)
*C09D 7/61* (2018.01)
*C08K 3/36* (2006.01)
*C08K 3/26* (2006.01)
*C08K 3/016* (2018.01)

(52) U.S. Cl.
CPC ............ *C09D 7/45* (2018.01); *C09D 7/47* (2018.01); *C09D 7/61* (2018.01); *C09D 7/69* (2018.01); *C08K 3/016* (2018.01); *C08K 3/36* (2013.01); *C08K 2003/265* (2013.01); *C08K 2003/267* (2013.01)

(58) Field of Classification Search
CPC ... C09D 1/02; C09D 5/18; C09D 7/40; C09D 7/61; C09D 7/69; C09D 7/45; C09D 7/47
See application file for complete search history.

(56) References Cited

FOREIGN PATENT DOCUMENTS

| KR | 10-0919968 B1 | 10/2009 |
|---|---|---|
| KR | 10-20100085472 A | 7/2010 |
| KR | 10-1306632 B1 | 9/2013 |
| KR | 10-20140022647 A | 2/2014 |
| WO | WO03/097227 A1 | 11/2003 |

OTHER PUBLICATIONS

KR100919968 translattion (Year: 2009).*
JIOS Aerogel Corporation, International Search Report and Written Opinion, PCT/KR2015/001285, dated Oct. 12, 2015, 29 pgs.
JIOS Aerogel Corporation, International Preliminary Report on Patentability, PCT/KR2015/001285, dated Aug. 15, 2017, 10 pgs.
JIOS Aerogel Corporation, Communication Pursuant to Rules 161(2) and 162, EP15882073.8, dated Oct. 5, 2017, 2 pgs.
JIOS Aerogel Corporation, Extended European Search Report, EP15882073.8, dated Aug. 3, 2018, 13 pgs.
JIOS Aerogel Corporation, Communication Pursuant to Rules 70(2) and 70a(2), EP15882073.8, dated Aug. 3, 2018, 3 pgs.
JIOS Aerogel Corporation, EP 15882073.8 Communication Pursuant to Article 94(3) EPC, dated Mar. 4, 2020, 3 pgs.
JIOS Aerogel Corporation, EP 15882073.8 Communication Pursuant to Article 94(3) EPC, dated Jan. 22, 2021, 3 pgs.

* cited by examiner

FIRE RESISTANT PAINT COMPOSITION, PRODUCTION METHOD FOR SAME, AND PAINTING METHOD FOR FIRE RESISTANT PAINT USING SAME

RELATED APPLICATION

This application is a continuation application of International Patent Application No. PCT/KR2015/001285, filed Feb. 9, 2015, which is incorporated by reference herein in its entirety.

TECHNICAL FIELD

The present application relates to fire-resistant paint compositions, methods of preparing the same, and methods of applying the same.

BACKGROUND ART

A generally known fire-resistant paint includes a binder, which foams and expands due to high-temperature heat in the case of fire.

However, a fire-resistant paint including only the binder has limitations in heat resistance and a foaming rate. Therefore, studies for overcoming these limitations are continuing.

SUMMARY

The present inventors suggest an aqueous fire-resistant paint composition including aerogel and a foaming agent together with a binder to solve the problems.

Specifically, in some embodiments, a fire-resistant paint composition, which includes a binder, aerogel, a foaming agent and water at specific contents, is provided.

In some embodiments, a method of preparing the fire-resistant paint composition is provided.

In some embodiments, a method of applying the fire-resistant paint composition is provided.

In some embodiments, a fire-resistant paint composition, which includes 70 to 95 wt % of a binder; 1 to 10 wt % of aerogel; 1 to 5 wt % of a foaming agent; and water as the remainder, is provided.

In some embodiments, the foaming agent is included at 1 to 3 wt % in the fire-resistant paint composition.

Hereinafter, each component of the fire-resistant paint composition provided in some embodiments is described.

First, the foaming agent is described as follows.

In some embodiments, the foaming agent is one or a mixture of two or more selected from the group consisting of calcium carbonate (CaCO3), magnesium carbonate (MgCO3), vermiculite, perlite, limestone and sodium bicarbonate (NaHCO3).

In some embodiments, the foaming agent includes a mixture of the calcium carbonate and magnesium carbonate.

In some embodiments, the foaming agent includes calcium carbonate with respect to magnesium carbonate in a weight ratio of 0.5:1 to 4:1.

In some embodiments, the foaming agent has an average particle diameter of 30 to 200 μm.

The aerogel is described as follows.

In some embodiments, the aerogel is hydrophobic or hydrophilic.

In some embodiments, the aerogel is silica aerogel, hydrophobic fumed silica or hydrophilic fumed silica.

In some embodiments, the aerogel is liquid or powder.

The binder is described as follows.

In some embodiments, the binder includes one or two or more silicates selected from the group consisting of sodium silicate, potassium silicate and a modified silicate.

In some embodiments, the silicate is liquid or powder.

In some embodiments, the fire-resistant paint composition further includes 0.1 to 5 wt % of an additive.

In some embodiments, the additive is one, or two or more, selected from the group consisting of a surfactant, a leveling agent and other additives.

Each of the additives is described as follows.

In some embodiments, the surfactant is active at a pH of 2 to 12.

In some embodiments, the surfactant is one or a mixture of two or more selected from the group consisting of polyalkylene oxide silane, sodium alkyl diphenyloxide disulfonate, polyoxyethylene alkyl ether sulfate, and polyoxyethylene tridecyl ether sulfate.

In some embodiments, the leveling agent includes at least one selected from the group consisting of an amine oxide, an alkyl carbohydrate ester, an alkoxylated polysiloxane, a dimethyl polysiloxane and a poly alkyl acrylate.

In some embodiments, the other additives are water-resistant additives including at least one selected from the group consisting of calcium hydroxide, magnesium oxide, magnesium hydroxide, sodium carbonate and montmorillonite.

In some embodiments, the water-resistant additive is included at less than 1 wt % in the fire-resistant paint composition.

In some embodiments, a method of preparing a fire-resistant paint composition includes preparing a mixture including 70 to 95 wt % of a binder, 1 to 10 wt % of aerogel, 1 to 5 wt % of a foaming agent and water as the remainder; and stirring the mixture.

In some embodiments, the mixture in the preparation process of a mixture including 70 to 95 wt % of a binder, 1 to 10 wt % of aerogel, 1 to 5 wt % of a foaming agent and water as the remainder further includes 0.1 to 5 wt % of an additive.

In some embodiments, the stirring process of the mixture is performed at 600 to 800 rpm.

In some embodiments, the stirring process of the mixture is performed for 30 to 60 minutes.

In some embodiments, a method of applying a fire-resistant paint includes preparing each of a material to be coated and the fire-resistant paint composition according to any one of the above-described compositions; and applying the fire-resistant paint composition on a surface of the material to be coated to form a paint film.

In some embodiments, the method further includes drying the formed paint film after the application process of the fire-resistant paint composition on a surface of the material to be coated to form a paint film.

In some embodiments, the drying is performed at 10 to 35° C.

In some embodiments, the drying is performed for 48 hours or more.

In some embodiments, the formed paint film has a thickness of 1 to 4 mm.

In some embodiments, the method further includes applying the fire-resistant paint composition on a surface of the formed paint film to form a second paint film after the application process of the fire-resistant paint composition on a surface of the material to be coated to form a paint film.

In some embodiments, a fire-resistant paint composition, which exhibits an excellent foaming rate, high foaming density and excellent foaming strength upon foaming caused by fire by including aerogel and a foaming agent together with a binder, and thus is capable of imparting improved heat insulation and heat resistance, is provided.

In some embodiments, a method of preparing a fire-resistant paint composition having the above-described properties is provided.

In some embodiments, a method of applying a fire-resistant paint, which is capable of imparting excellent heat insulation to a material to be coated by application using the fire-resistant paint composition, is provided.

DETAILED DESCRIPTION

Figure 1:
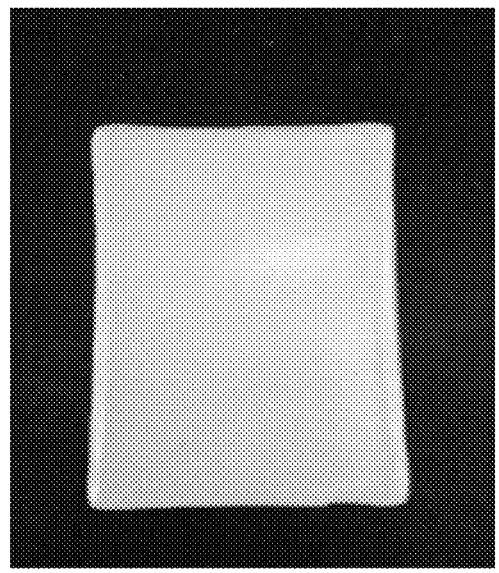
FIGS. 1 and 2 are images obtained by photographing a surface (FIG. 1) and a side surface (FIG. 2) before exposure to high temperature in the case of an example of the present invention.

Hereinafter, embodiments of the present invention will be described in detail. However, these are provided as preferable examples, and do not limit the scope of the present invention. The scope of the present invention is defined by the claims to be described below.

In some embodiments, there is provided a fire-resistant paint composition which includes 70 to 95 wt % of a binder; 1 to 10 wt % of aerogel; 1 to 5 wt % of a foaming agent; and water as the remainder.

The fire-resistant paint composition is an aqueous fire-resistant paint composition capable of imparting excellent heat insulation and fire resistance by including the aerogel having very low thermal conductivity and the foaming agent, which improves the foaming performance of the binder and the aerogel, together with the binder which foams and expands in a high-temperature environment.

Specifically, the binder, foaming agent and water may be included in an inner pore of the aerogel.

When the binder foams and expands in a high-temperature environment (e.g., fire), the aerogel whose inner pore includes the binder also foams and expands, and the foaming rate of the binder and aerogel may be further improved due to the foaming agent.

As a result, since the fire-resistant paint composition includes a material having low thermal conductivity and exhibits excellent foaming strength upon foaming compared to a generally known fire-resistant paint composition, heat insulation and fire resistance may be improved.

In addition, when the binder and the foaming agent are inorganic materials, harmful gas and smoke are not generated upon foaming so that the fire-resistant paint can be free from the environmental regulation problem unlike a generally known solvent-type fire-resistant paint.

As described above, 70 to 95 wt % of the binder, 1 to 10 wt % of the aerogel, 1 to 5 wt % of the foaming agent and water as the remainder are included with respect to 100 wt % of a total weight of the fire-resistant paint composition. The reason why a content of each material is limited is as follows.

Binder: 70 to 95 wt %

When the binder is included at greater than 95 wt % in the fire-resistant paint composition, contents of the aerogel and the foaming agent are relatively decreased, and thus an insignificant effect of improving a foaming rate as above-described is exhibited. Therefore, it is necessary to limit a content of the binder to 95 wt % or less.

However, when the binder is included at less than 70 wt %, a foaming rate of the binder is lowered due to a low content thereof, which decreases foaming performance, and a paint film formed by using such a composition exhibits low strength. Therefore, a content of the binder is limited to 70 wt % or more.

Aerogel: 1 to 10 wt %

When the aerogel is included at greater than 10 wt % in the fire-resistant paint composition, it is difficult to uniformly disperse the aerogel in the composition due to a high content thereof, and productivity is degraded. Also, since the viscosity of the composition may be rapidly increased, when such a composition is used, there is a limitation in forming a paint film with a uniform thickness due to a limitation in self-leveling. In consideration of these problems, it is necessary to limit a content of the aerogel in the fire-resistant paint composition to 10 wt % or less.

However, when the aerogel is included in an excessively small amount, that is, at less than 1 wt %, an insignificant effect of imparting heat insulation by the aerogel is exhibited. Therefore, a content of the aerogel is limited to 1 wt % or more.

Foaming Agent: 1 to 5 wt %

When the foaming agent is included at greater than 5 wt % in the fire-resistant paint composition, it is difficult to uniformly disperse the foaming agent in the composition due to a high content thereof, and productivity is degraded. Also, the appearance of a paint film formed by using such a composition is poor. In consideration of these problems, it is necessary to limit a content of the foaming agent in the fire-resistant paint composition to 5 wt % or less.

However, when the foaming agent is included in an excessively small amount, that is, at less than 1 wt %, an insignificant effect of improving a foaming rate as above-described is exhibited. Therefore, a content of the foaming agent is limited to 1 wt % or more.

Specifically, the foaming agent may be included at 1 to 3 wt % in the fire-resistant paint composition.

Hereinafter, each component of the fire-resistant paint composition provided in some embodiments will be described.

First, the foaming agent will be described as follows.

The foaming agent is not particularly limited as long as it is a material that facilitates formation of foam with respect to other materials. For example, the foaming agent may be one or a mixture of two or more selected from the group consisting of calcium carbonate ($CaCO_3$), magnesium carbonate ($MgCO_3$), vermiculite, perlite, limestone and sodium bicarbonate ($NaHCO_3$).

Specifically, the foaming agent may include a mixture of the calcium carbonate and magnesium carbonate.

In this case, the foaming agent may include calcium carbonate with respect to magnesium carbonate in a weight ratio of 0.5:1 to 4:1. However, when an excessive amount of the calcium carbonate is included above a weight ratio of 4:1, each of the materials is not uniformly dispersed in the foaming agent and there is a problem of agglomeration. On the other hand, when a small amount of the calcium carbonate is included below a weight ratio of 0.5:1, an insignificant foaming effect is exhibited. Therefore, the weight ratio is limited as described above.

Independently, an average particle diameter of the foaming agent is not particularly limited, but a thickness of a paint film formed by applying a fire-resistant paint composition including the foaming agent on a material to be coated may be considered.

Specifically, an average particle diameter of the foaming agent needs to be limited to 500 μm or less in consideration of the thickness of a paint film as described above, and to 30 μm or more in consideration of foaming performance. That is, the foaming agent may have an average particle diameter of 30 to 500 μm.

The aerogel will be described as follows.

The aerogel may be hydrophobic or hydrophilic. That is, whether or not the aerogel is hydrophobic or hydrophilic does not affect the heat insulation or foaming property of the fire-resistant paint composition including the aerogel.

Specifically, the hydrophobic aerogel may be, for example, silica aerogel, hydrophobic fumed silica or the like, and the hydrophilic aerogel may be, for example, hydrophilic fumed silica.

In this case, the aerogel may be liquid or powder. When the aerogel is powder, an average particle diameter thereof is not particularly limited.

The binder will be described as follows.

The binder is not particularly limited as long as it can foam and expand in a high-temperature environment (e.g., fire) as described above.

For example, the binder may include one or two or more silicates selected from the group consisting of sodium silicate, potassium silicate and a modified silicate.

The silicate may be liquid or powder.

Meanwhile, the fire-resistant paint composition provided in some embodiments may further include 0.1 to 5 wt % of an additive.

The additive serves to impart various types of functionality to the fire-resistant paint composition or improve properties thereof.

Specifically, the additive may be one or two or more selected from the group consisting of a surfactant (dispersant), a leveling agent and other additives.

Each of the additives will be described as follows.

First, when the binder is a hydrophilic silicate and the aerogel is hydrophobic, the surfactant needs to be further included to improve dispersibility. That is, the surfactant may act as a dispersant.

In this case, the surfactant may be active at a pH of 2 to 12. For example, the surfactant may be one or a mixture of two or more selected from the group consisting of polyalkylene oxide silane, sodium alkyl diphenyloxide disulfonate, polyoxyethylene alkyl ether sulfate, and polyoxyethylene tridecyl ether sulfate.

In some cases, the leveling agent may be further included to improve fluidity of a paint film formed by using the fire-resistant paint composition. For example, the leveling agent may include at least one selected from the group consisting of an amine oxide, an alkyl carbohydrate ester, an alkoxylated polysiloxane, a dimethyl polysiloxane and a poly alkyl acrylate.

In addition, a water-resistant additive may be further included to improve water resistance of the fire-resistant paint composition. That is, the other additives may be water-resistant additives including at least one selected from the group consisting of calcium hydroxide, magnesium oxide, magnesium hydroxide, sodium carbonate and montmorillonite.

In this case, the water-resistant additive may be included at less than 1 wt % in the fire-resistant paint composition. When the additive is included at 1 wt % or more, it is difficult to uniformly disperse the additive in the composition, and productivity is degraded.

In some embodiments, there is provided a method of preparing a fire-resistant paint composition, which includes preparing a mixture including 70 to 95 wt % of a binder, 1 to 10 wt % of aerogel, 1 to 5 wt % of a foaming agent and water as the remainder; and stirring the mixture.

Specifically, the mixture in the preparation process of a mixture including 70 to 95 wt % of a binder, 1 to 10 wt % of aerogel, 1 to 5 wt % of a foaming agent and water as the remainder may further include 0.1 to 5 wt % of an additive.

The method is a method of preparing the fire-resistant paint composition having the above-described properties, and the importance of the limited range of each of the materials has been already described, and therefore will be omitted.

Meanwhile, the stirring process of the mixture may be performed at 600 to 800 rpm.

When a stirring speed is less than 600 rpm, the time for uniformly dispersing each material in the mixture may increase, and when a stirring speed is greater than 800 rpm, the mixture may be solidified due to generated heat.

Independently, the stirring process of the mixture may be performed for 30 to 60 minutes.

When a stirring time is less than 30 minutes, each material may be not uniformly dispersed in the mixture, and when a stirring time is greater than 60 minutes, the mixture may be solidified due to heat generated upon the stirring.

In some embodiments, there is provided a method of applying a fire-resistant paint, which includes preparing each of a material to be coated and the fire-resistant paint composition according to any one of the above-described compositions; and applying the fire-resistant paint composition on a surface of the material to be coated to form a paint film.

The method is an application method using the fire-resistant paint composition having the above-described properties, and the formed paint film may impart excellent heat insulation and fire resistance. Descriptions of the fire-resistant paint composition are the same as described above, and therefore, the application method will be described except for them.

In some embodiments, the method further includes drying the formed paint film after the application process of the fire-resistant paint composition on a surface of the material to be coated to form a paint film.

In some embodiments, the drying is performed at 10 to 35° C.

When the drying is performed at less than 10° C., a paint film may be cracked, and when the drying is performed at greater than 35° C., a drying time is excessively shortened, which may actually interfere with formation of a stable paint film.

Independently, the drying may be performed for 48 hours or more. When the drying is performed for less than 48 hours, the drying may be insufficiently performed due to a short period of time, and a paint film thus formed may exhibit poor foaming performance.

Meanwhile, the formed paint film may have a thickness of 1 to 4 mm.

When the formed paint film has a thin thickness of less than 1 mm, there is a limitation in foaming performance, and when the formed paint film has a thickness of 4 mm or less, sufficient fire-resistant performance is exhibited, and therefore, a paint film having a thickness of greater than 4 mm is not economical.

Meanwhile, the method may further include applying the fire-resistant paint composition on a surface of the formed paint film to form a second paint film after the application process of the fire-resistant paint composition on a surface of the material to be coated to form a paint film.

This means that the process of forming a paint film may be repeated several times as necessary.

Hereinafter, exemplary examples and test examples of the present invention will be described. However, the following examples should be considered as just exemplary examples of the present invention, and the scope of the present invention is not limited to the following examples.

EXAMPLE 1

A silicate resin ($Na_2SiO_3$ commercially available from Mokyang Chemical) as an inorganic binder, a surfactant (fluorine-based surfactant commercially available from Momentive) and a leveling agent ($[(CH_3)_2SiO]_3$ commercially available from BYK Additives & Instruments) were added to water as a solvent, and silica aerogel powder (SiO commercially available from JIOS Aerogel) was further added thereto and dispersed. Afterward, water-resistant additives ($Ca(OH)_2$ commercially available from Daejung Chemicals & Metals Co. Ltd.) and a foaming agent (mixture of $CaCO_3$ and $MgCO_3$ commercially available from Daejung Chemicals & Metals Co. Ltd.) were further added, thereby preparing a mixture.

Specifically, the mixture was prepared in such a way that 93 wt % of the silicate resin, 0.5 wt % of the surfactant, 0.5 wt % of the leveling agent, 3 wt % of the aerogel powder, 1 wt % of the other additives, 2 wt % of the foaming agent and water as the remainder with respect to 100 wt % of a total weight of the mixture were included.

The prepared mixture was stirred for 30 minutes at 800 rpm, thereby obtaining a fire-resistant paint composition.

The obtained fire-resistant paint composition was applied on a surface of a material to be coated (an iron plate with a thickness of 0.5 mm and a size of 300 mm x 300 mm) and dried, thereby forming a paint film with a thickness of 3 mm.

EXAMPLES 2 TO 4

A fire-resistant paint composition was prepared in the same manner as Example 1 except that a content of each of the raw materials (that is, the binder, aerogel, foaming agent, surfactant, leveling agent and other additives) was as listed in the following Table 1.

In addition, a paint film was formed in the same manner as Example 1 by using each of the fire-resistant paint compositions according to Examples.

COMPARATIVE EXAMPLE 1

A fire-resistant paint composition was obtained in the same manner as Example 1 except that the foaming agent was not added, and then applied on a material to be coated, thereby forming a paint film with a thickness of 3 mm.

COMPARATIVE EXAMPLES 2 AND 3

A fire-resistant paint composition was prepared in the same manner as Comparative Example 1 except that a content of each of the raw materials (that is, the binder, aerogel, surfactant, leveling agent and other additives) was as listed in the following Table 1.

In addition, a paint film was formed in the same manner as Comparative Example 1 by using each of the fire-resistant paint compositions according to Comparative Examples.

TABLE 1

| Classification | Binder | Aerogel | Foaming agent | Surfactant | Leveling agent | Other additives |
|---|---|---|---|---|---|---|
| Example 1 | 93 | 3 | 2 | 1 | 0.5 | 0.5 |
| Example 2 | 94 | 3 | 1 | 1 | 0.5 | 0.5 |
| Example 3 | 92 | 3 | 3 | 1 | 0.5 | 0.5 |
| Example 4 | 91 | 3 | 4 | 1 | 0.5 | 0.5 |
| Comparative Example 1 | 95 | 3 | — | 1 | 0.5 | 0.5 |
| Comparative Example 2 | 90 | 8 | — | 1 | 0.5 | 0.5 |
| Comparative Example 3 | 95 | 3 | 0.5 | 0.5 | 0.5 | 0.5 |

Annotation: In Table 1, a content of each material was indicated in wt % based on 100 wt % of a total weight of the mixture.

TEST EXAMPLE 1

Evaluation of Foaming Rate

Each sample on which a paint film was formed according to Example 1 and Comparative Example 1 was exposed to a high temperature of 1,000° C. for 180 minutes using a box furnace to evaluate a foaming rate of each sample.

In order to evaluate a foaming rate, the surface and side surface of each sample before and after exposure to high temperature were photographed, images of which are shown in FIGS. 1 to 8.

Figure 2:
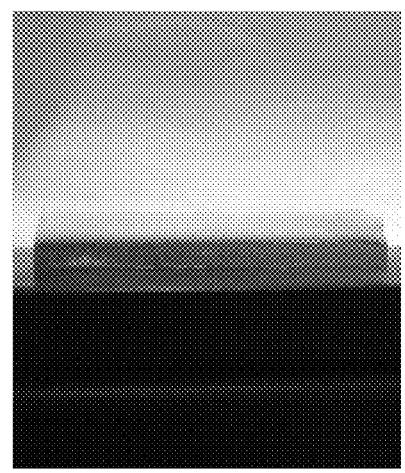
Figure 3:
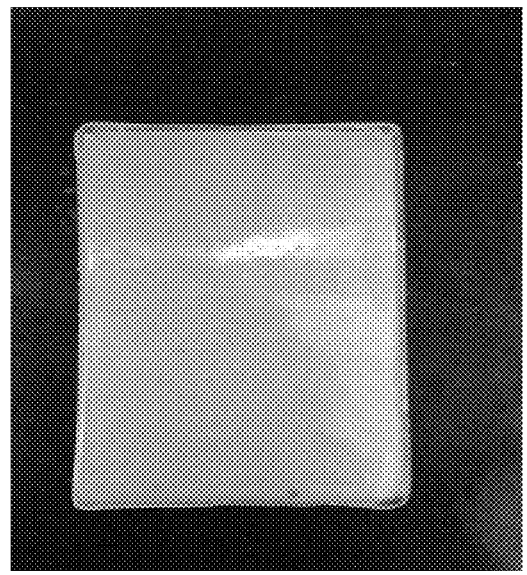
FIGS. 3 and 4 are images obtained by photographing a surface (FIG. 3) and a side surface (FIG. 4) before exposure to high temperature in the case of a comparative example of the present invention.
Figure 4:
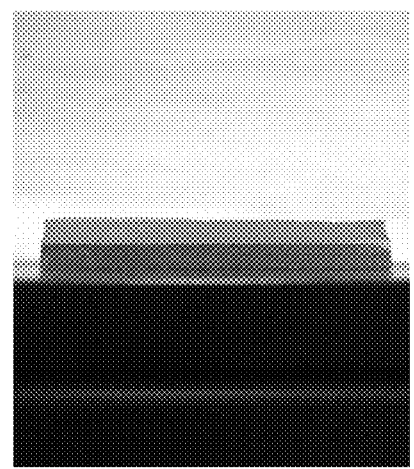

FIGS. 1 to 4 are images which are photographed before exposure to high temperature. Images of the surface and side surface of a sample according to Example 1 are shown in FIG. 1 and FIG. 2, respectively, and images of the surface and side surface of a sample according to Comparative Example 1 are shown in FIG. 3 and FIG. 4, respectively.

Figure 5:
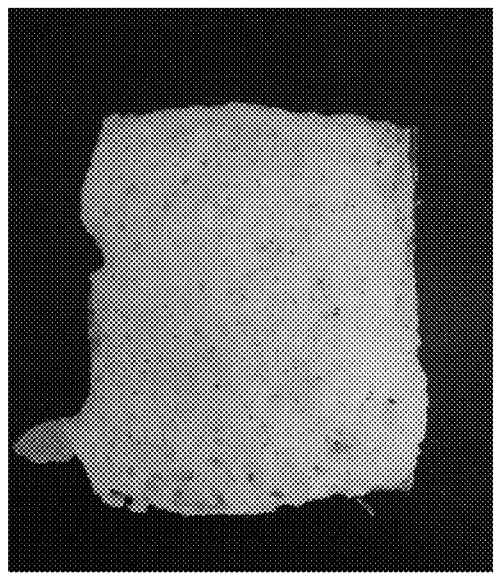
FIGS. 5 and 6 are images obtained by photographing a surface (FIG. 5) and a side surface (FIG. 6) after exposure to high temperature in the case of an example of the present invention.
Figure 6:
Figure 7:
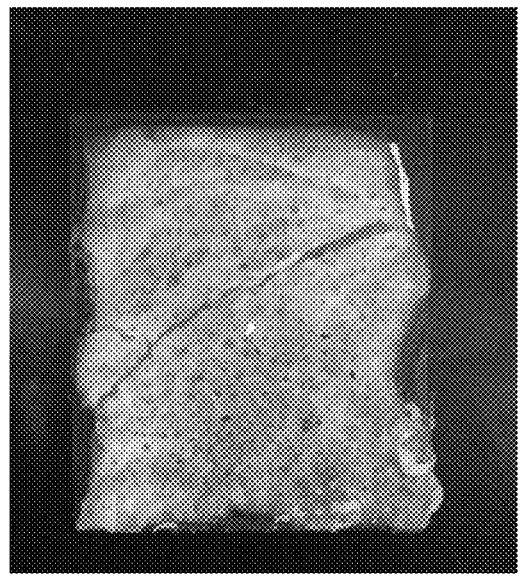
FIGS. 7 and 8 are images obtained by photographing a surface (FIG. 7) and a side surface (FIG. 8) after exposure to high temperature in the case of a comparative example of the present invention.
Figure 8:
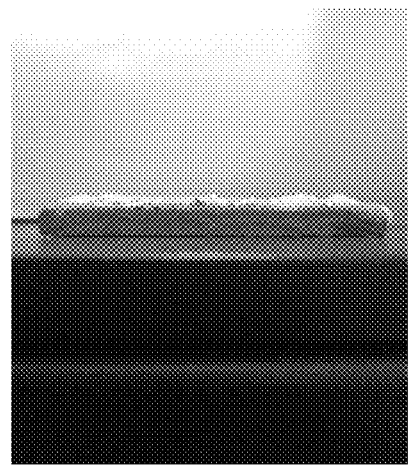

FIGS. 5 to 8 are images which are photographed after exposure to high temperature. Images of the surface and side surface of a sample according to Example 1 are shown in FIG. 5 and FIG. 6, respectively, and images of the surface and side surface of a sample according to Comparative Example 1 are shown in FIG. 7 and FIG. 8, respectively.

When FIGS. 1 to 8 are compared, it can be seen that a foaming rate in Example 1 is excellent compared to that in Comparative Example 1. Therefore, it can be evaluated that a foaming rate of the fire-resistant paint composition according to Example 1 in which a foaming agent was further included is more excellent than that of the fire-resistant paint composition according to Comparative Example 1 in which a binder, aerogel and additives were included.

Therefore, it is inferred that since the foaming rates of aerogel and a binder were further improved by including aerogel having low thermal conductivity together with a binder and by further including a foaming agent in the case of Example 1, fire resistance and heat insulation performance when exposed to fire also are excellent.

TEST EXAMPLE 2

Evaluation of Fire Resistance and Heat Insulation Performance

In order to directly identify the inferred result, while each sample on which a paint film was formed according to Examples 1 to 4 and Comparative Examples 1 to 3 was exposed to fire for 180 minutes using gas torch, a temperature of a rear surface of each sample (i.e., a surface which was not exposed to fire) was measured at each time listed in the following Table 2.

Figure 9:
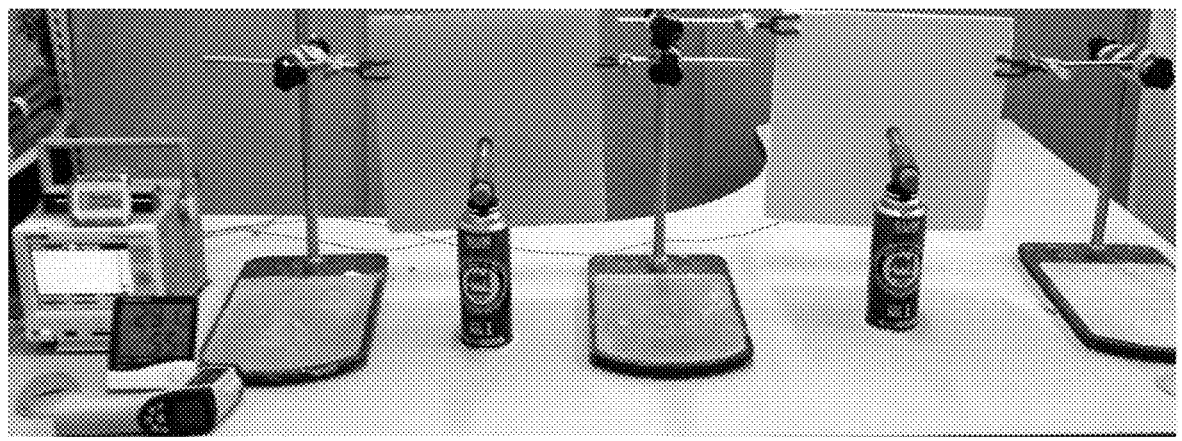
FIG. 9 is an image obtained by photographing an experimental setup for evaluating fire resistance and heat insulation performance with respect to an example and a comparative example of the present invention.

FIG. 9 is an image obtained by photographing an experimental setup for evaluating fire resistance and heat insulation performance. After the evaluation by such a setup, results were recorded in Table 2 and were plotted on a graph of FIG. 10 (blue line: Comparative Example 1, red line: Example 1).

foaming agent was included at 1 to 5 wt %, unlike Comparative Examples 1 and 2 in which a foaming agent was not included and Comparative Example 3 in which a foaming agent was included at 0.5 wt %.

Figure 11:
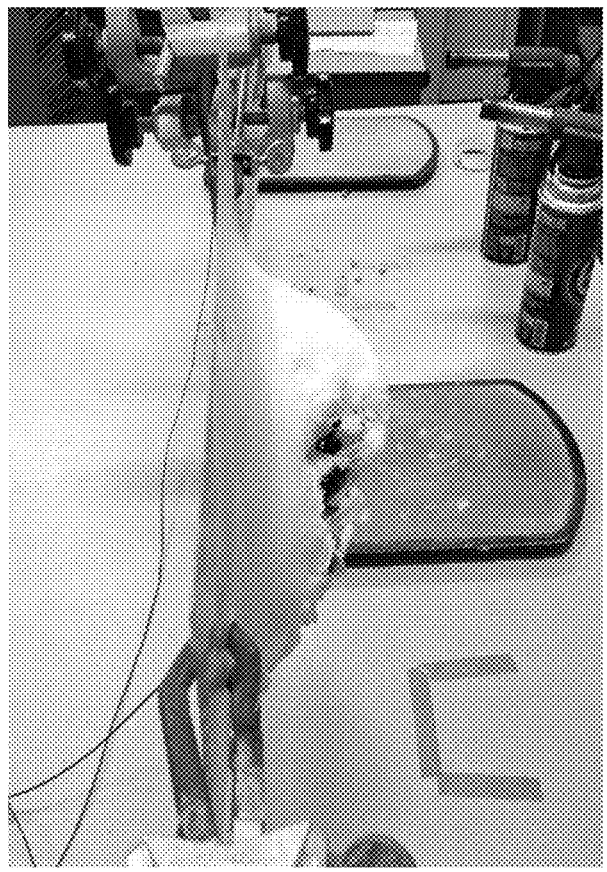
FIGS. 11 to 13 are images obtained by photographing a side surface of each sample of an example (FIG. 11) and a comparative example (FIGS. 12 and 13) of the present invention after evaluation of fire resistance and heat insulation performance.
Figure 12:
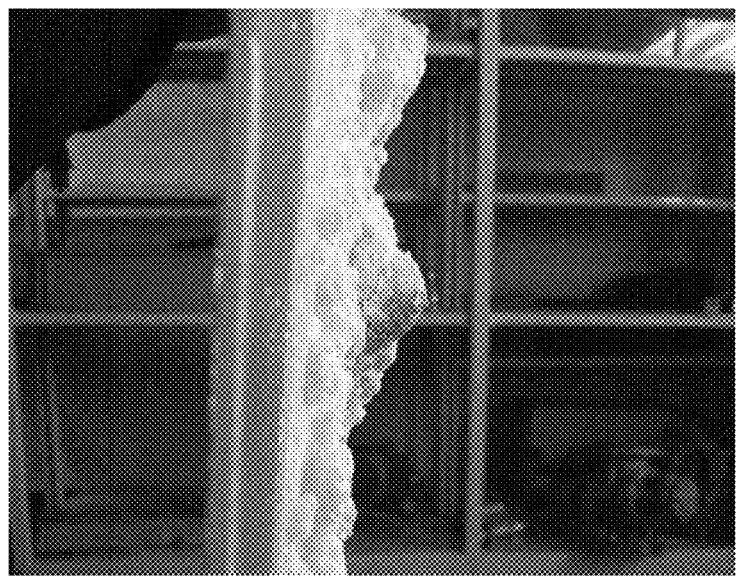
Figure 13:
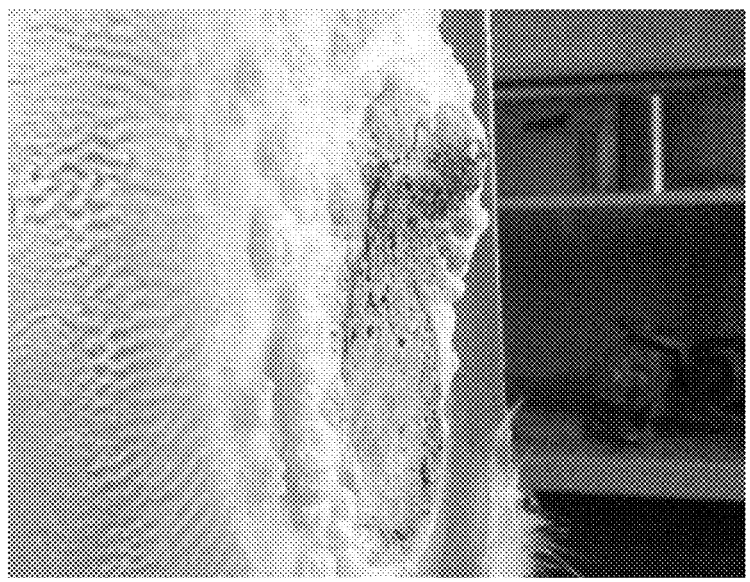

In addition, a side surface of each sample was photographed after the evaluations, images of which are shown in FIG. 11 (Example 1) and FIGS. 12 and 13 (Comparative Example 1). When FIGS. 11 to 13 are compared, as evaluated in Test Example 1, it can be confirmed once again that a foaming rate of Example 1 was more excellent than that of Comparative Example 1.

Through these results, it was proven that since the foaming rates of aerogel and a binder were further improved by including aerogel having low thermal conductivity together with a binder and by further including a foaming agent in the case of Example 1, fire resistance and heat insulation performance when exposed to fire also are excellent.

The present invention is not limited to the embodiments, but may be implemented in various different forms, and it may be understood by those skilled in the art that the present invention may be embodied in other concrete forms without changing the technological scope and essential features. Therefore, the aforementioned embodiments should be considered as only examples in all aspects and not for purposes of limitation.

What is claimed is:

1. An aqueous fire-resistant paint composition consisting of, out of 100 wt %:
    70 to 95 wt % of a binder;
    1 to 10 wt % of an aerogel;
    2 to 4 wt % of a foaming agent consisting of calcium carbonate ($CaCO_3$) and magnesium carbonate ($MgCO_3$);

TABLE 2

| | Time (min) | 0 | 5 | 10 | 20 | 40 | 60 | 90 | 120 | 150 | 180 |
|---|---|---|---|---|---|---|---|---|---|---|---|
| Comparative Example 1 | Temperature (° C.) | 27 | 97.5 | 103.8 | 143.5 | 166.8 | 173.3 | 169.9 | 174.8 | 175.4 | 181.7 |
| Comparative Example 2 | | 26 | 98.1 | 105.3 | 137.4 | 158.9 | 162.4 | 167.7 | 169 | 172.8 | 172.3 |
| Comparative Example 3 | | 25 | 97 | 102.2 | 139.8 | 160.5 | 170.7 | 171.9 | 171.8 | 171 | 172.7 |
| Example 1 | | | 2.5 | 86.2 | 89.9 | 95.8 | 111 | 111 | 119.3 | 127.5 | 130.5 | 135.1 |
| Example 2 | | 26 | 91.1 | 97.2 | 120 | 139.5 | 153.6 | 157.1 | 158 | 157.3 | 157.5 |
| Example 3 | | 25 | 73.6 | 78.3 | 85.4 | 106 | 115.7 | 120.5 | 126 | 130.8 | 134.6 |
| Example 4 | | 26 | 74.6 | 80.1 | 83.7 | 105.8 | 114.3 | 118.6 | 124 | 132.2 | 134.4 |

Annotation: The values were obtained by measuring a temperature of a surface which was not exposed to fire at respective times.

Figure 10:
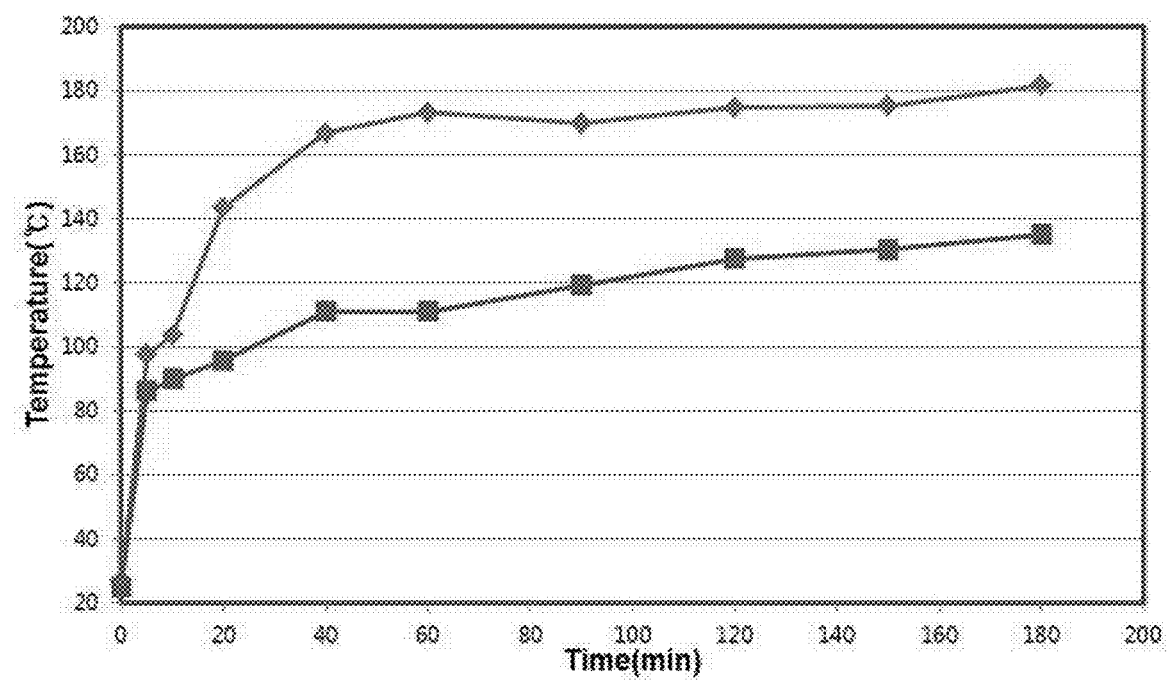
FIG. 10 is a graph illustrating evaluation results of fire resistance and heat insulation performance with respect to an example and a comparative example of the present invention.

Referring to Table 2 and FIG. 10, in the case of Comparative Example 1, it was confirmed that a temperature of a surface which was not exposed to fire was rapidly increased over time, and reached 181.7° C. after the evaluation was completed.

On the other hand, in the case of Example 1, a temperature increase rate of a surface which was not exposed to fire was low compared to Comparative Example 1, and a surface temperature after the evaluation was completed was 135.1° C., which is about 45° C. lower than that in Comparative Example 1.

Further, referring to Table 2, it can be seen that a temperature increase rate of a surface which was not exposed to fire was low due to improvement in foaming performance, a temperature measured after the evaluation was completed also was low in the case of Examples 1 to 4 in which a 0.1 to 5 wt % of additives selected from the group consisting of a surfactant, a leveling agent, and a water-resistant additive; and
water as remainder,
wherein the aerogel includes, in its pores, the binder.

2. The aqueous fire-resistant paint composition according to claim 1, wherein the foaming agent is a mixture of calcium carbonate and magnesium carbonate in a weight ratio of 0.5:1 to 4:1.

3. The aqueous fire-resistant paint composition according to claim 1, wherein the foaming agent has an average particle diameter of 30 to 200.

4. The aqueous fire-resistant paint composition according to claim 1, wherein the aerogel is silica aerogel, hydrophobic fumed silica or hydrophilic fumed silica.

5. The aqueous fire-resistant paint composition according to claim 1, wherein the binder includes one or two or more silicates selected from the group consisting of sodium silicate, potassium silicate and a modified silicate.

6. The aqueous fire-resistant paint composition according to claim 1, wherein the surfactant is active at a pH of 2 to 12.

7. The aqueous fire-resistant paint composition according to claim 1, wherein the surfactant is one or a mixture of two or more selected from the group consisting of polyalkylene oxide silane, sodium alkyl diphenyloxide disulfonate, polyoxyethylene alkyl ether sulfate, and polyoxyethylene tridecyl ether sulfate.

8. The aqueous fire-resistant paint composition according to claim 1, wherein the leveling agent is one or a mixture of two or more selected from the group consisting of an amine oxide, an alkyl carbohydrate ester, an alkoxylated polysiloxane, and a poly alkyl acrylate.

9. The aqueous fire-resistant paint composition according to claim 1, wherein the water-resistant additive is selected from the group consisting of sodium carbonate, montmorillonite, and a mixture thereof.

10. The aqueous fire-resistant paint composition according to claim 9, wherein the water-resistant additive is included at less than 1 wt % in the fire-resistant paint composition.

11. A method of preparing the aqueous fire-resistant paint composition of claim 1, comprising:
stirring a mixture of the binder, aerogel, foaming agent, and additives, wherein the mixture consists of, out of 100 wt. %: 70 to 95 wt % of the binder, 1 to 10 wt % of the aerogel, 2 to 4 wt % of the foaming agent, 0.1 to 5 wt % of the additives, and water as remainder;
during the stirring, the aerogel includes, in its pores, the binder; and
the additives are selected from the group consisting of a surfactant, a leveling agent, and a water-resistant additive.

12. The method according to claim 11, wherein the stirring process of the mixture is performed at 600 to 800 rpm and/or for 30 to 60 minutes.

13. A method of applying a fire-resistant paint, comprising:
preparing each of a material to be coated and the aqueous fire-resistant paint composition according to claim 1; and
applying the aqueous fire-resistant paint composition on a surface of the material to be coated to form a paint film.

14. The method according to claim 13, further comprising drying the formed paint film after the application process of the aqueous fire-resistant paint composition on a surface of the material to be coated to form a paint film.

15. The method according to claim 14, wherein the drying process of the formed paint film is performed at 10 to 35° C. or for 48 hours or more.

16. The method according to claim 13, wherein the formed paint film has a thickness of 1 to 4 mm.

17. The method according to claim 13, further comprising applying the aqeuous fire-resistant paint composition on a surface of the formed paint film to form a second paint film after the application process of the aqueous fire-resistant paint composition on a surface of the material to be coated to form a paint film.

* * * * *